United States Patent [19]

Sugiyama

[11] Patent Number: 4,556,296
[45] Date of Patent: Dec. 3, 1985

[54] OBJECTIVE LENS FOR USE WITH INFORMATION STORAGE DISKS

[75] Inventor: Takahiro Sugiyama, Tokyo, Japan

[73] Assignee: Asahi Kogaku Kogyo Kabushiki Kaisha, Tokyo, Japan

[21] Appl. No.: 430,146

[22] Filed: Sep. 30, 1982

[30] Foreign Application Priority Data

Oct. 6, 1981 [JP] Japan .................... 56-159042

[51] Int. Cl.$^4$ ............................ G02B 9/14
[52] U.S. Cl. ............................ 350/475
[58] Field of Search ............ 350/474, 475, 457

[56] References Cited

U.S. PATENT DOCUMENTS 4,139,267 2/1979 Minoura ............... 350/475
4,416,519 11/1983 Kobayashi ........... 350/475

Primary Examiner—John K. Corbin
Assistant Examiner—Paul M. Dzierzynski
Attorney, Agent, or Firm—Sughrue, Mion, Zinn, Macpeak & Seas

[57] ABSTRACT

An objective lens for use with an information storage disk comprises a three-group three-element lens system including a first group composed of a positive-meniscus lens having a convex side directed toward a light source, a second group composed of a negative-meniscus lens having a concave side directed toward the light source, and a third group composed of a positive-meniscus lens having a convex side directed toward the light source. The objective lens satisfies the following requirements:

(1) $1.8F < F_1 < 2.5F$
(2) $|F_2| > 25F$
(3) $1.2F < F_3 < 1.8F$
(4) $d_4 < 0.3F$ where F is the composite focal length of the entire lens system, $F_1$ if the focal length of the first group lens, $F_2$ is the focal length of the second group lens, $F_3$ is the focal length of the third group lens, and $d_4$ is the air spacing between the second group lens and the third group lens.

4 Claims, 6 Drawing Figures

COMA ABERRATION

--- MERIDIONAL
— SAGITTAL

WAVE FRONT ABERRATION

OBJECTIVE LENS FOR USE WITH INFORMATION STORAGE DISKS

BACKGROUND OF THE INVENTION

The present invention relates to an objective lens for use with high-density information storage disks.

Optical pickup devices such as video disk devices utilizing laser beams are widely known in the art. A laser beam emitted from a laser beam source is focused by an objective lens onto the surface of a disk to be reproduced, and the laser beam as reflected from the disk surface passes again through the objective lens back toward the laser beam source. The information recorded on the disk can be detected by the intensity of the laser beam as received. The objective lens is rendered movable for tracking and focusing purposes, and hence is required to be small in size and light in weight. It is necessary that the spacing or operating distance between the objective lens and the disk surface be as large as possible since the objective lens would tend to hit the disk surface unless the distance therebetween were greater than a certain interval. To read the information recorded at a high density on the disk, the objective lens needs to have a resolving power of about 1 micron. The objective lens is therefore required to have a numerical aperture (N.A.) of about 0.5.

SUMMARY OF THE INVENTION

It is an object of the present invention is to provide an objective lens for use with information storage disks which meets the foregoing requirements, has a numerical aperture of 0.5, a sufficient long operating distance of 0.44F, and various aberrations are well compensated for.

BRIEF DESCRIPTIONS OF THE DRAWINGS

In the accompanying drawings:

FIGS. 2, 4 and 6 show aberrations of the lens systems including cover glasses.

DESCRIPTION OF THE PREFERRED EMBODIMENTS

Figure 1:
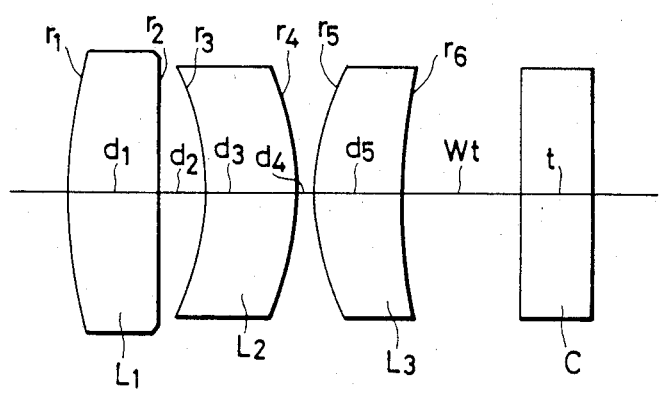
FIG. 1 is a diagram showing the construction of a lens system according to Example 1 of the present invention.
Figure 2:
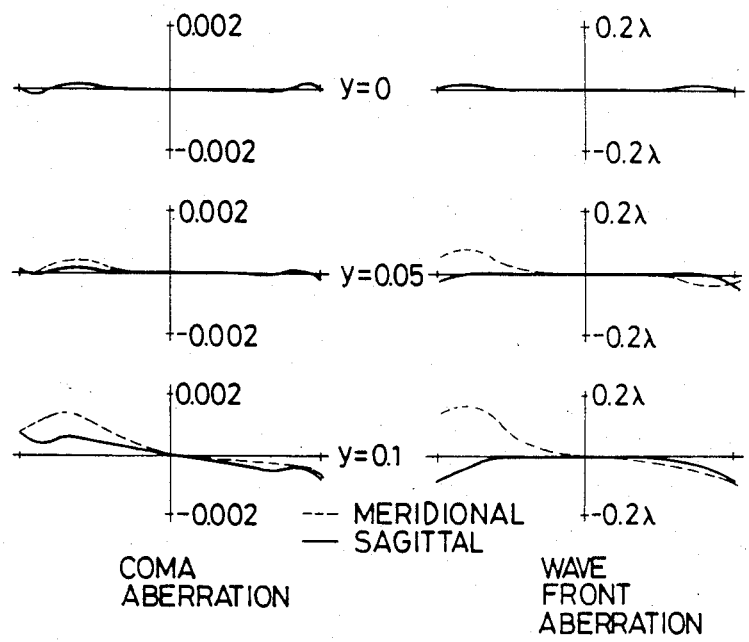
FIG. 2 is a set of diagrams illustrative of coma and wave front aberrations of the lens system of Example 1.
Figure 3:
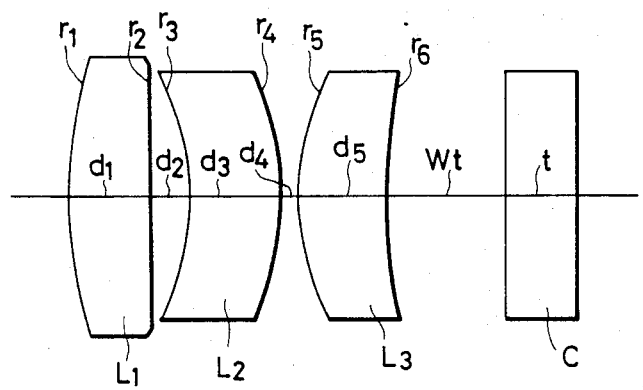
FIG. 3 is a diagram showing the construction of a lens system according to Example 2 of the present invention.
Figure 4:
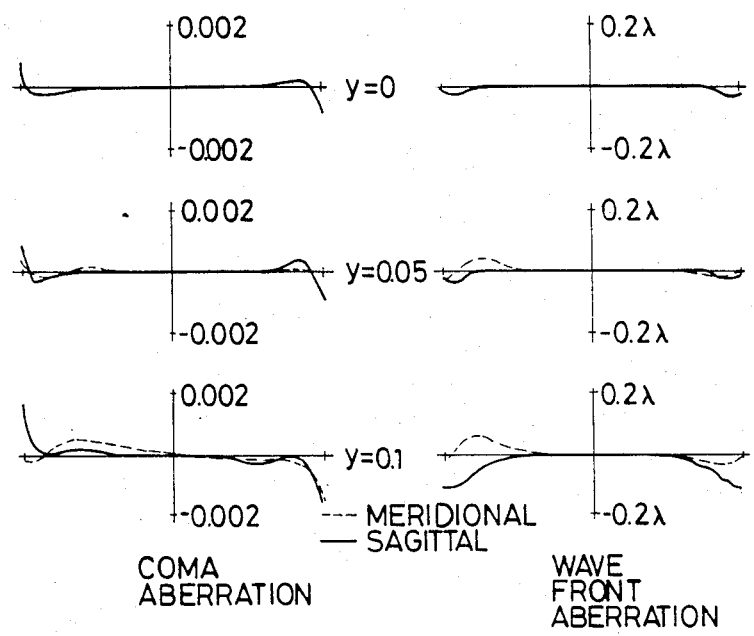
FIG. 4 is a set of diagrams illustrative of coma and wave front aberrations of the lens system of Example 2.
Figure 5:
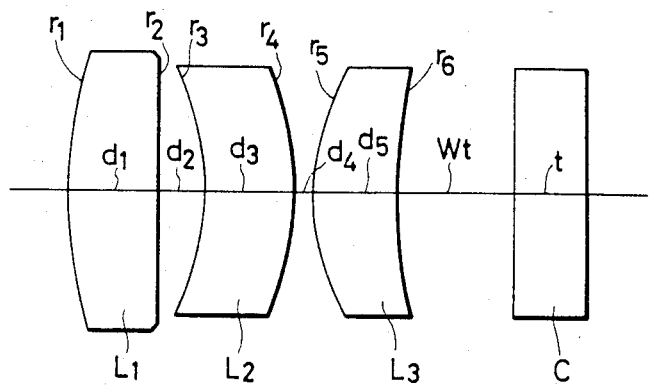
FIG. 5 is a diagram showing the construction of a lens system according to Example 3 of the present invention.
Figure 6:
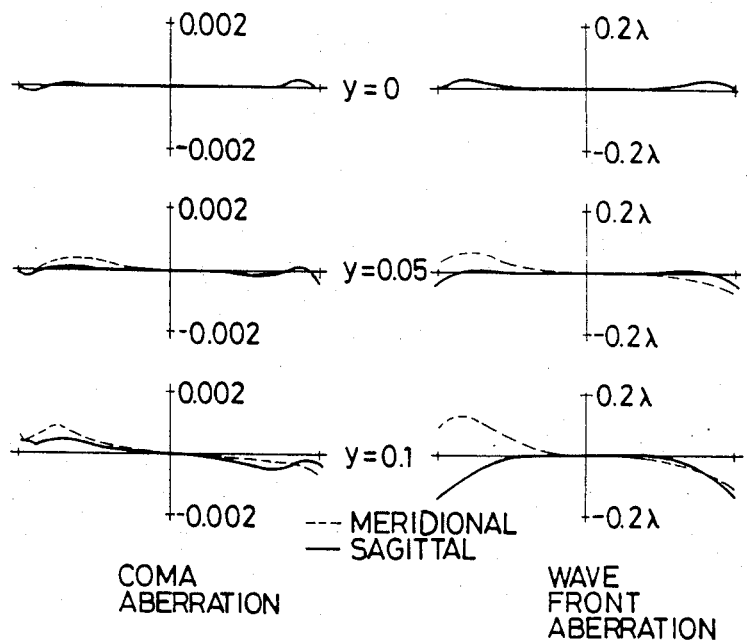
FIG. 6 is a set of diagrams illustrative of coma and wave front aberrations of the lens system of example 3.

An objective lens according to the present invention comprises a three-group three-element lens system including a first component composed of a positive-meniscus lens $L_1$ having a convex side directed toward a light source, a second component composed of a negative-meniscus lens $L_2$ having a concave side directed toward the light source, and a third component composed of a positive-meniscus lens $L_3$ having a convex side directed toward the light source. Reference character C denotes a cover glass for an information storage disc (not shown).

It is now assumed that F is the composite focal length of the entire lens system, $F_1$ is the focal length of the first component $F_2$ is the focal length of the second component, $F_3$ is the focal length of the third component, $r_i$ is the radius of curvature of the ith lens surface, $d_i$ is the lens thickness or lens spacing of the ith lens or lens spacing, and $N_j$ is the refractive index of the jth lens. The objective lens according to the invention meets the following requirements:

(1) $1.8F < F_1 < 2.5F$
(2) $|F_2| > 25F$
(3) $1.2F < F_3 < 1.8F$
(4) $d_4 < 0.3F$

The above requirements will be described below.

The first requirement serves to determine the focal length of the first component an to well correct the spherical aberration. If the focal length of the first component were smaller than the lower limit 1.8F, then negative spherical aberration generated by the first group would be too large, and the amount by which spherical aberration is to be corrected at the second component would increase sharply, resulting in difficulty in achieving a desired amount of spherical aberration. If the focal length were greater than the upper limit 2.5F, then the spherical aberration created by the first component could be reduced, but since the composite focal length of the overall system is F, the focal lengths of the second and third components would have to be reduced. In consequence, their spherical aberrations would be increased and at the same time the operating distance would become smaller.

The second requirement serves to determine the focal length of the second group, to limit the positive spherical aberration at the second group, to balance the negative spherical aberrations generated by the first and third elements, and to well correct the spherical aberration. If the focal length of the second group were smaller than the lower limit 25F, then the positive spherical aberration created by the second component would be too small, and it would be difficult to correct the negative spherical aberrations by the first and second components. The focal length of the second group should be increased also in order to increase the operating distance.

The third requirement serves to determine the focal length of the third component and to well correct the spherical aberration. If the focal length were smaller than the lower limit 1.2F, then the negative spherical aberration generated by the third component would be too large, and the spherical aberration at the second group would be over-corrected, resulting in difficulty in correcting the spherical aberration. If the focal length were larger than the upper limit 1.8F, then the negative spherical aberration created by the third component would be reduced, but the focal lengths of the first and second components would become smaller, also resulting in difficulting in correcting the spherical aberration well. The reason for the smaller focal length of the third component than that of the first component in the first and third requirements is that the height at which the laser beam hits the lens is lower with the third component than with the first components.

The fourth requirement serves to reduce the size of the lens system. If the distance were larger than the upper limit 0.3F, then the total length of the lens system would be longer and the purpose of providing a small-size lens system could not be met.

The objective lens for use with information storage disks according to the present invention meets the all four requirements, corrects various aberrations, particularly spherical aberration, and has a sufficiently long operating distance.

Numerical data of Examples 1, 2 and 3 of the present invention will now be given below.

Designated as $W_t$ is the air spacing or operating distance between the objective lens and a cover glass C for an information storage disk, t is the thickness of the cover glass C, and $N_t$ is the refractive index of the cover glass at 780 nm.

EXAMPLE 1

| | | |
|---|---|---|
| $r_1 = 8.136$ | $d_1 = 1.500$ | $N_1 = 1.86890$ |
| $r_2 = 158.717$ | $d_2 = 0.800$ | |
| $r_3 = -4.236$ | $d_3 = 1.500$ | $N_2 = 1.78569$ |
| $r_4 = -4.819$ | $d_4 = 0.300$ | |
| $r_5 = 3.834$ | $d_5 = 1.500$ | $N_3 = 1.86890$ |
| $r_6 = 8.915$ | | |
| $F = 4.50$ | N.A. = 0.50 | |
| $W_t = 2.00$ | $t = 1.20$ | $N_t = 1.49$ |
| $F_1 = 2.18F$ | | |
| $|F_2| = 74.99F$ | | |
| $F_3 = 1.51F$ | | |

EXAMPLE 2

| | | |
|---|---|---|
| $r_1 = 7.235$ | $d_1 = 1.346$ | $N_1 = 1.86890$ |
| $r_2 = 88.984$ | $d_2 = 0.677$ | |
| $r_3 = -4.157$ | $d_3 = 1.500$ | $N_2 = 1.78569$ |
| $r_4 = -4.706$ | $d_4 = 0.300$ | |
| $r_5 = 4.048$ | $d_5 = 1.498$ | $N_3 = 1.86890$ |
| $r_6 = 9.139$ | | |
| $F = 4.50$ | N.A. = 0.50 | |
| $W_t = 2.00$ | $t = 1.20$ | $N_t = 1.49$ |
| $F_1 = 2.00F$ | | |
| $|F_2| = 49.85F$ | | |
| $F_3 = 1.63F$ | | |

EXAMPLE 3

| | | |
|---|---|---|
| $r_1 = 7.502$ | $d_1 = 1.500$ | $N_1 = 1.78569$ |
| $r_2 = 1000.000$ | $d_2 = 0.800$ | |
| $r_3 = -4.249$ | $d_3 = 1.481$ | $N_2 = 1.78569$ |
| $r_4 = -4.805$ | $d_4 = 0.300$ | |
| $r_5 = 3.712$ | $d_5 = 1.412$ | $N_3 = 1.86890$ |
| $r_6 = 7.982$ | | |
| $F = 4.50$ | N.A. = 0.50 | |
| $W_t = 2.00$ | $t = 1.20$ | $N_t = 1.49$ |
| $F_1 = 2.14F$ | | |
| $|F_2| = 60.38F$ | | |
| $F_3 = 1.54F$ | | |

What is claimed is:

1. An objective lens for use with an information storage disk comprising a three-component, three-element lens system including a first component composed of a positive-meniscus lens having a convex side directed toward a light source, a second component composed of a negative-meniscus lens having a concave side directed toward the light source, and a third component composed of a positive-meniscus lens having a convex side directed toward the light source, said objective lens satisfying the following requirements:
   (1) $1.8F < F_1 < 2.5F$
   (2) $|F_2| > 25F$
   (3) $1.2F < F_3 < 1.8F$
   (4) $d_4 < 0.3F$ where F is the overall focal length of the lens system, $F_1$ is the focal length of the first component, $F_2$ is the focal length of the second component, $F_3$ is the focal length of the third component, and $d_4$ is the air spacing between the second and third components.

2. The objective lens of claim 1 further comprising a cover glass disposed between the objective lens system and the disk and system further satisfying the following table:

| | | |
|---|---|---|
| $r_1 = 8.136$ | $d_1 = 1.500$ | $N_1 = 1.86890$ |
| $r_2 = 158.717$ | $d_2 = 0.800$ | |
| $r_3 = -4.236$ | $d_3 = 1.500$ | $N_2 = 1.78569$ |
| $r_4 = -4.819$ | $d_4 = 0.300$ | |
| $r_5 = 3.834$ | $d_5 = 1.500$ | $N_3 = 1.86890$ |
| $r_6 = 8.915$ | | |
| $F = 4.50$ | N.A. = 0.50 | |
| $W_t = 2.00$ | $t = 1.20$ | $N_t = 1.49$ |
| $F_1 = 2.18F$ | | |
| $|F_2| = 74.99F$ | | |
| $F_3 = 1.51F$ | | | where $W_t$ is the air spacing or operating distance between the objective lens system and a cover glass for the information storage disk, t is the thickness of the cover glass, and $N_t$ is the refractive index of the cover glass.

3. The objective lens of claim 1 further comprising a cover glass disposed between the objective lens system and the disk and further satisfying the following table:

| | | |
|---|---|---|
| $r_1 = 7.235$ | $d_1 = 1.346$ | $N_1 = 1.86890$ |
| $r_2 = 88.984$ | $d_2 = 0.677$ | |
| $r_3 = -4.157$ | $d_3 = 1.500$ | $N_2 = 1.78569$ |
| $r_4 = -4.706$ | $d_4 = 0.300$ | |
| $r_5 = 4.048$ | $d_5 = 1.498$ | $N_3 = 1.86890$ |
| $r_6 = 9.139$ | | |
| $F = 4.50$ | N.A. = 0.50 | |
| $W_t = 2.00$ | $t = 1.20$ | $N_t = 1.49$ |
| $F_1 = 2.00F$ | | |
| $|F_2| = 49.85F$ | | |
| $F_3 = 1.63F$ | | | where $W_t$ is the air spacing or operating distance between the objective lens system and a cover glass for the information storage disk, t is the thickness of the cover glass, and $N_t$ is the refractive index of the cover glass.

4. The objective lens of claim 1 further comprising a cover glass disposed between the objective lens system and the disk and further satisfying the following table:

| | | |
|---|---|---|
| $r_1 = 7.502$ | $d_1 = 1.500$ | $N_1 = 1.78569$ |
| $r_2 = 1000.000$ | $d_2 = 0.800$ | |
| $r_3 = -4.249$ | $d_3 = 1.481$ | $N_2 = 1.78569$ |
| $r_4 = -4.805$ | $d_4 = 0.300$ | |
| $r_5 = 3.712$ | $d_5 = 1.412$ | $N_3 = 1.86890$ |
| $r_6 = 7.982$ | | |
| $F = 4.50$ | N.A. = 0.50 | |
| $W_t = 2.00$ | $t = 1.20$ | $N_t = 1.49$ |
| $F_1 = 2.14F$ | | |
| $|F_2| = 60.38F$ | | |
| $F_3 = 1.54F$ | | | where $W_t$ is the air spacing or operating distance between the objective lens system and a cover glass for the information storage disk, t is the thickness of the cover glass, and $N_t$ is the refractive index of the cover glass.

* * * * *